June 5, 1956 J. R. PIERCE 2,749,463

SOLID STATE TELEVISION PICK-UP TUBE

Filed Oct. 24, 1951

INVENTOR
J. R. PIERCE
BY
Hugh S. Wertz
ATTORNEY

United States Patent Office 2,749,463

Patented June 5, 1956

2,749,463

SOLID STATE TELEVISION PICK-UP TUBE

John R. Pierce, Berkeley Heights, N. J., assignor to Bell Telephone Laboratories, Incorporated, New York, N. Y., a corporation of New York Application October 24, 1951, Serial No. 252,839

2 Claims. (Cl. 313—65)

This invention relates to electro-optical devices and more particularly to electron camera tubes for television.

It is an object of this invention to utilize in electron camera tubes a semiconductor having the property that light incident thereon produces positive hole-electron pairs.

It is another object of this invention to improve the response of electron camera tubes.

Electron camera tubes for television should combine the characteristics of high sensitivity, high output, high resolution and ease of manufacture. Commercial tubes of the type now being used do not have all of these desirable characteristics. The present invention in one of its more important aspects relates to the provision of a tube which combines to a large extent all of these features.

In accordance with the invention, an electron camera tube for television pick-up purposes is provided which employs as a target a semi-conductor which has the property that light incident thereon produces positive hole-electron pairs. Such a semiconductor is silicon or germanium. A light image is formed on a surface of the semiconductor producing a corresponding positive charge pattern. A low velocity electron beam scans the charge pattern to produce an image current. As the beam scans this pattern, the greater the positive charge, the greater the number of electrons in the beam which penetrate the semiconductor and flow through an output resistor connected thereto. In one embodiment of the invention, the electron beam and the light image are incident on the same side of a semiconductor, while in another embodiment the radiations from the object and the electron beam are applied to opposite sides of the semiconducting material.

The invention will be more readily understood by referring to the following description taken in connection with the accompanying drawing forming a part thereof, in which.

Figure 1:
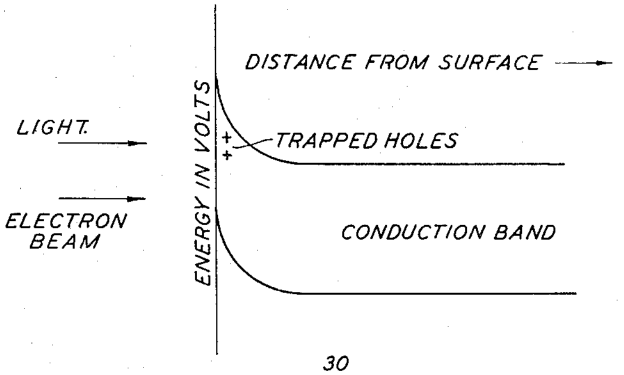
Fig. 1 is an energy level diagram near the surface of a semiconductor of the type used in the invention.

Referring more particularly to the drawing, Fig. 1 is an energy level diagram near the surface of a semiconductor such as silicon or germanium. Light incident on the surface produces positive hole-electron pairs. A high sensitivity results because one hole-electron pair can be obtained per quantum of absorbed radiation. With the energy levels bent as shown in Fig. 1, the electrons produced are whisked off to the right. The holes are drawn to the surface where they will remain (until recombination) as a surface positive charge. If this charge could flow parallel to the surface, a light image formed on the surface would not result in a charge image. However, under appropriate conditions the holes can be trapped locally at the surface, either by impurities introduced in the bulk of the melt, or by surface treatment, or by surface states. Thus a light image is changed to a positive charge image and a change in the contact potential is produced when light falls on the semiconductor. This material is particularly suitable for use in electron camera tube targets for it gives a high resolution since no grids are needed, the only structure being one of a molecular fineness.

Figures 2, 3:
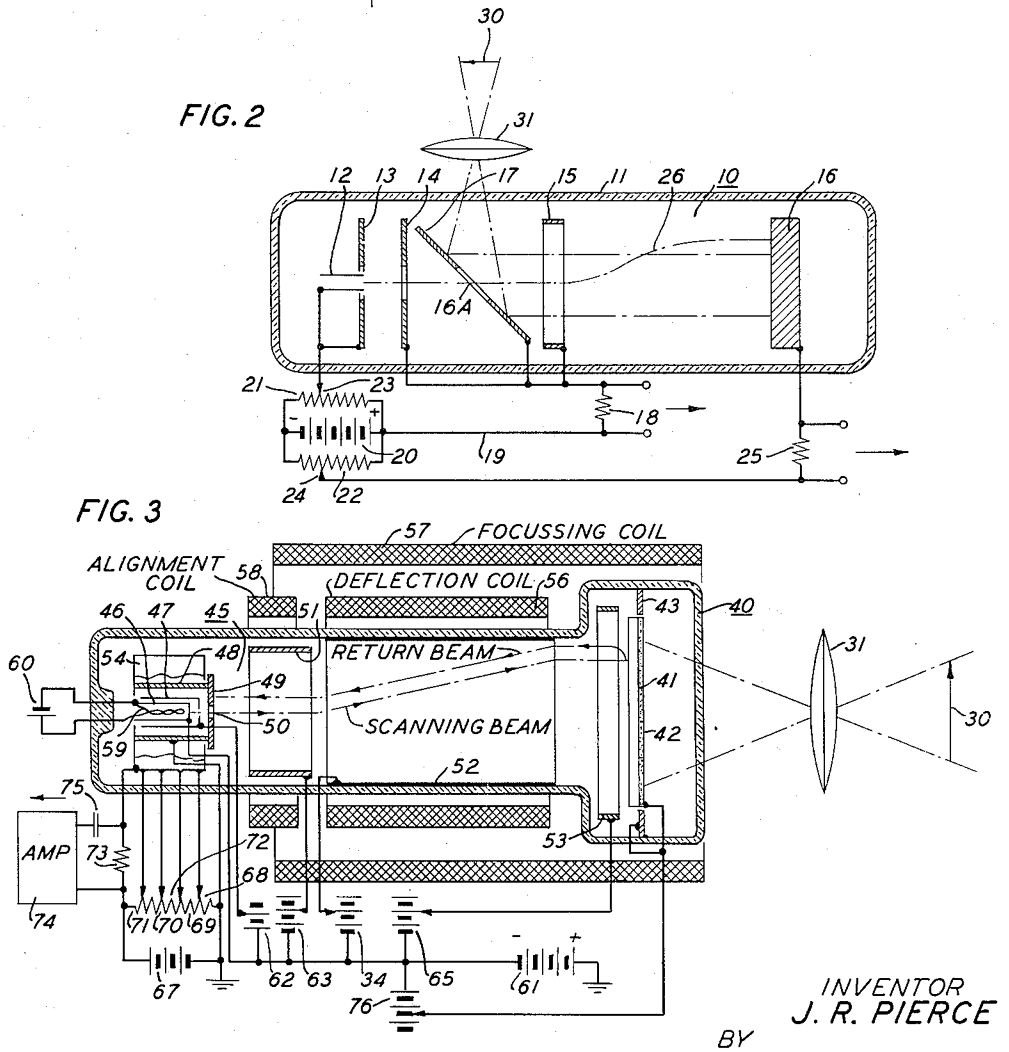
Fig. 2 is a schematic representation of a cathode-ray tube of this invention and certain of its associated circuits and auxiliary apparatus.
Fig. 3 is a schematic view showing a cathode-ray television transmitter tube of the image orthicon type employing a semi-conductor in accordance with the invention.

Fig. 2 is a schematic view, partially in cross section, of a television electron camera tube 10 which uses a target structure 16 employing material which exhibits the effect described above, together with certain related circuits and other apparatus. The tube 10 comprises an evacuated envelope 11 containing the target 16 and suitable electron gun structure for producing a beam of electrons and for directing it through the aperture 16A in a mirror 17 which is angularly disposed with respect to the axis of the electron beam. The electron gun structure comprises a cathode 12 having associated therewith an apertured electrode member 13 at the same potential as the cathode, a first anode member 14 on the cathode side of the mirror 17 and a second anode member on the other side of the mirror. The first and second anode members 14 and 15 and the mirror 17 are placed at the same potential, which is positive with respect to the cathode 12, by means of the output resistor 18 and connection 19 to the positive pole of a source of direct potential 20. Connected between the positive and negative terminals of the source 20 are two potentiometer resistors 21 and 22. An inner terminal 23 of the resistor 21 is connected to the cathode 12 while an inner terminal 24 of the resistor 22 is connected through a second output resistor 25 to the target 16. The potential of the target 16 is not far removed from that of the cathode 12 in order that the beam produced by the electron gun structure, by means well known to those skilled in the electron optical art, reaches the surface of the target at a very low velocity. The cathode beam is focussed and deflected by any suitable means (not shown in Fig. 2 but an example of which appears in the embodiment of Fig. 3 to be described below). The focussing is produced by a longitudinal magnetic field while the beam is deflected by transverse fields, produced along part of its length, so as to scan the front surface of the target 16 and to approach this surface essentially normal thereto, as indicated by the dot-dash line 26 in Fig. 2. The potential of the target 16 is made either a little positive or a little negative with respect to that of the cathode 12 by means of the potentiometer resistor arrangement described above. Radiations from an object or field of view 30 are applied to the front surface of the target 16 by means of a suitable optical system, represented schematically by the single lens 31, and the mirror 17.

In operation, the potential of the target 16 is adjusted (by varying the potentials of the taps 23 and 24) to such a value that a part of the electron stream approaching the front surface of the member 16 is turned back. Such electrons as strike the surface of the target 16 are whisked into the interior of the target by the fields and returned to the cathode 12 through the output resistor 25. When a light image falls on the surface of the target, a corresponding positive charge pattern is formed. As the beam scans over this pattern, the greater the positive charge, the greater the fraction of the electrons of the beam which penetrate the target and flow through the resistor 25. Thus, there is a signal voltage across the resistor 25 which is proportional to (or increasing with) the local intensity of the light in the light image. An alternative output arrangement makes use of the potential drop produced across the output resistor 18 by the returned fraction of the beam current. The output is large because the positive charge is not neutralized by the electrons, but merely acts as a control grid to control the flow of current past it. Thus there is an inherent amplifying effect in the electron camera tube in accordance with the invention.

There is an alternative mode of operation of the tube 10 shown in Fig. 2 but it results in a somewhat lower output. If it is assumed that the beam electrons are either trapped on the surface or combined with the trapped holes, then there is an output proportional to the input light, as in the orthicon type of camera tube.

The tube 10 has storage to the extent of the lifetime of the trapped holes. This lifetime can be controlled by various means such as, for example, the control of the temperature of the target 16.

The tube 10 is easy to fabricate because no fine grids are required, the photosensitive surface is rugged and can be formed an treated outside the tube (unlike cesiated surfaces, which are very delicate and must be formed during pumping).

An alternative form of tube 40 is shown in Fig. 3. This structure is analogous to the image orthicon type of tube except that it employs as a target a thin semiconductor in the form of a thin wafer 41. The image orthicon type of tube is described in detail in an article by Messrs. Rose, Weimer and Law on page 424 of "The Journal of Institute of Radio Engineers" for July 1946. In the present arrangement, the two sided target 41, formed of semiconducting material, such as silicon or germanium, which has the properties discussed above and which may or may not be provided with a thin transparent metallic coating 42 on the right-hand side thereof, replaces the thin glass target and its accompanying fine mesh screen in the image orthicon tube described in the Rose, Weimer and Law article. The photosensitive surface on the end wall of the image orthicon tube is not necessary in the tube of Fig. 3 in accordance with this invention. Surrounding the target is a metallic barrier 43 which prevents electrons from passing around the target into the space at the right of the target in Fig. 3. The target 41 and the element 43 can be placed at the same potential, if desired. The tube 40 comprises an evacuated container enclosing the target 41, an electron optical system 45 for producing an electron beam and including a cathode 46, a control electrode 47, an accelerating electrode 48 having a relatively large alignment disc 49 with aperture 50 therein, a cylinder 51, a metallic anode member 52 which is preferably a coating on the inside walls of the tube, and a metallic alignment ring 53. The tube 40 is also provided with an electron multiplier 54 of any suitable type but which is preferably of the "pin-wheel" type used in the commercial image orthicon. External to the tube 40 are a deflecting yoke of coils 56, a focussing coil 57 and an alignment coil 58 similar to corresponding members in the image orthicon and the purpose of which will be described more fully below.

The cathode 46 is heated by any suitable heater 59 receiving current from the source 60. The cathode 46 is placed at a potential of, for example, minus 300 volts (but which may, for example, be appreciably higher) with respect to ground by means of a source 61 whose positive terminal is grounded and whose negative terminal is connected to the member 46. The adjustable source 62 holds a control electrode 47 at a suitable negative potential with respect to the cathode 46. The electrode 48, with its apertured disc 49, is connected to ground. Electrode 51 is held at roughly 200 volts positive with respect to the cathode by means of adjustable source 63, whose negative terminal is connected to the negative terminal of source 61. The coating 52 is connected to a cathode through an adjustable source 64 of such value that it is roughly 250 volts positive with respect to the cathode. The metal ring 53 is placed at a suitable positive potential with respect to the cathode by means of an adjustable source 65. The metal coating 42 is biased with respect to the cathode by variable source 76. The coating 42 is preferably placed approximately at cathode potential. The highest potential of the electron multiplier 54 is about 1500 volts positive with respect to ground and this potential is applied by means of source 67, the negative terminal of which is connected to ground and to the alignment disc 49 which actually is the first electrode of the multiplier. Various intermediate potentials for the electrodes of the electron multiplier 54 are provided by means of taps 68, 69, 70 and 71, respectively, of a potentiometer resistor 72 connected across the source 67. The positive terminal of the source 67 is connected to the final anode or collector of the multiplier 54 through an output resistor 73 and connected across this resistor is an output amplifier 74 the coupling circuit of which includes a coupling condenser 75. The amplifier 74 is in turn connected to the other elements of the television circuit which prepare a video current for transmission to the receiving station.

The operation of the arrangement shown in Fig. 3 will now be described. Radiations from the object or field of view 30 are projected upon the right-hand side of the target 41 by means of the optical system 31 producing positive holes on the target. The right-hand side of this target may be treated to attract electrons while the left-hand side of the target is treated to attract the holes. Thus the holes are whisked through the thin wafer target 41 and produce a charge image on the side opposite to that struck by the light image.

At the same time that a charge image is being accumulated on the left side of the target 41, a beam of electrons scans this side of the target. The scanning beam is of the low velocity type used in the commercial image orthicon tube. The beam starts at the thermionic cathode 46 at a potential of about —300 volts (with respect to ground) and is accelerated by the electron optical system 45 to approximately zero volts (actually 300 volts positive with respect to the cathode). From the cathode 46 to the target 41 the beam is acted upon by the approximately uniform magnetic field produced by the coil structure 57 and the transverse magnetc field produced by the deflection coils 56. The beam leaves the aperture 50 substantially parallel to the axis, is deflected by the transverse magnetic field during the middle part of its projectory, and finally approaches the target 41 substantially at normal incidence; that is parallel to the axis again. As the beam electrons aproach the target, they are decelerated to approximately cathode potential, that is to a potential of about —300 volts. If three is no positive charge increment on the target 41, all the electrons are reflected and return toward the cathode 46 along their initial paths as indicated by the dash-dot lines in Fig. 3. If there is a positive charge pattern on the target 41, the electrons from the scanning beam are deposited in sufficient numbers to neutralize the positive charge increment thereon and restore the potential of the region to that of the cathode, that is about —300 volts. The remaining electrons are reflected back toward the cathode, as indicated in the drawing. Under equilibrium conditions, all the beam current is returned to the electron multiplier 54 which is concentric with the cathode 46. Before equilibrium is reached, the number of electrons in the return beam is reduced by the amount necessary to neutralize the positive charge increments on the target 41. This reduction in intensity of the return beam to the electron multiplier 24 constitutes the video signal information.

The return beam arrives in the region of the cathode 46 very near the aperture 50 through which it previously emerged although it has become considerably enlarged in cross section. This return beam strikes the disc 49 at a velocity which is sufficient to generate a larger number of secondary electrons than there are primary electrons in the return beam. This disc 49 (as pointed out above) serves as the first stage of the electron multiplier 54, the secondary electrons from it being focussed into the succeeding stages of the multiplier 54 which are arranged concentric with and behind this first stage, the whole multiplier being represented in the drawing by the structure identified by the reference character 24. The number of stages of the electron multiplier need not be large;

for example five stages (or less) of electron multiplication is sufficient. The type of multiplier used in the commercial image orthicon tube is satisfactory for this purpose.

The output current from the final stage of the multiplier 54 is taken from the resistor 73 and applied through the coupling condenser 75 to the wide band television amplifier 74 where it is amplified and applied, as above described, to other elements of the television transmitter circuit.

The alignment coil 58 is used, as in the image orthicon, to correct for helical motion resulting from misalignment of the electron gun and the magnetic field produced by the focussing coil 57. The position of the ring 53 and the potential thereof are chosen to correct for helical motion resulting from the deflection fields produced by the yoke 56, also as in the well-known image orthicon type of tube.

Various modifications can be made in the embodiments described above without departing from the spirit or scope of the invention. The specific potentials applied to the various elements are herein given merely by way of example and it is to be understood that their values may be made materially different from those given without changing the general method of operation of the device described herein.

What is claimed is:

1. An electronic camera tube comprising an electron source, a target for electrons consisting solely of a continuous thin wafer of a semiconductor material selected from the group consisting of silicon and germanium and having the property that a light image incident thereon produces at the surface thereof locally trapped hole-electron pairs for developing a surface contact potential in said semiconductor representative of said incident light image, means for developing an output signal current proportional to the local intensity of the light in the light image incident upon said target comprising means for scanning said target with electrons from said electron source and means at the electron source end of said tube for collecting a return beam of electrons containing intensity variations proportional to said surface contact potential, and means for developing therefrom an output signal.

2. An electronic camera tube comprising an electron source, a target for electrons consisting solely of a continuous thin wafer of a semiconductor material selected from the group consisting of silicon and germanium and having the property that a light image incident thereon produces at the surface thereof locally trapped hole-electron pairs for developing a surface contact potential in said semiconductor representative of said incident light image, means for developing an output signal current proportional to the local intensity of the light in the light image incident upon said target comprising means for scanning said target with electrons from said electron source and an electron multiplier at the electron source end of said tube for receiving and multiplying the electrons constituting a return beam containing intensity variations proportional to said surface contact potential, and means connected thereto for developing an output signal.

References Cited in the file of this patent

UNITED STATES PATENTS

| | | |
|---|---|---|
| 2,156,392 | Iams | May 2, 1939 |
| 2,544,753 | Graham | Mar. 13, 1951 |
| 2,555,091 | Lubszynski | May 29, 1951 |
| 2,560,606 | Shive | July 17, 1951 |
| 2,589,704 | Kirkpatrick et al. | Mar. 18, 1952 |
| 2,622,219 | Schagen | Dec. 16, 1952 |